United States Patent
Zeira (10) Patent No.: US 7,346,103 B2
(45) Date of Patent: Mar. 18, 2008

(54) MULTI USER DETECTION USING EQUALIZATION AND SUCCESSIVE INTERFERENCE CANCELLATION

(75) Inventor: Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 609 days.

(21) Appl. No.: 10/748,544

(22) Filed: Dec. 30, 2003

(65) Prior Publication Data

US 2004/0223538 A1 Nov. 11, 2004

Related U.S. Application Data

(60) Provisional application No. 60/451,591, filed on Mar. 3, 2003.

(51) Int. Cl.
*H03H 7/30* (2006.01)
(52) U.S. Cl. ............... 375/229; 375/130; 370/335; 370/336
(58) Field of Classification Search ........... 375/229, 375/130; 370/335, 336
See application file for complete search history.

(56) References Cited

U.S. PATENT DOCUMENTS

| 5,933,423 A | 8/1999 | Laakso |
| 6,075,808 A | 6/2000 | Tsujimoto |
| 6,426,983 B1 | 7/2002 | Rakib et al. |
| 2002/0018454 A1* | 2/2002 | Misra et al. ............ 370/336 |

FOREIGN PATENT DOCUMENTS

DE  196 16 828 A  11/1997

OTHER PUBLICATIONS

Tsatsanis et al.: "Adaptive blind interference cancellation in CDMA systems", Seamless Interconnection for Universal Services; Global Telecommunications Conference, Globecom '99 (CAT. No. 99CH37042);. pp. 487-491 vol. 1a; XP000958336 1999, Piscataway, NJ, USA, IEEE, USA ISBN: 0-7803-5796-5.

Pan et al. "Low Complexity Data Detection Using Fast Fourier Transform Decomposition of Channel Correlation Matrix", Globecom'01 IEEE Global Telecommunications Conference, San Antonio, TX Nov. 25-29, 2001, vol. 2 of 6 pp. 1322-1326, XP001099319, ISBN: 0-7803-7206-9.

Misra et al. "A Computationally Efficient Hybrid Joint Detection and Successive Interference Cancellation", VTC 2001 Spring. IEEE VTS 53$^{rd}$. Vehicular Technology Conference. vol. 3 of 4. Conf 53. May 6, 2001 pp. 1784-1788, XP001082450, ISBN: 0-7803-6728-6.

Tsai et al. "Hybrid MMSE and SIC for Multiuser Detection", VTC 2001 Spring. IEEE VTS 53$^{rd}$. Vehicular Technology Conference. vol. 3 of 4. Conf 53. May 6, 2001 pp. 1779-1783, XP001082449, ISBN: 0-7803-6728-6.

* cited by examiner

*Primary Examiner*—Mohammed Ghayour
*Assistant Examiner*—Juan Alberto Torres
(74) *Attorney, Agent, or Firm*—Volpe and Koenig, P.C.

(57) ABSTRACT

A plurality of signals are received in a shared spectrum. Samples of the received user signals are produced as a received vector. The received vector is segmented into a plurality of segments. For each segment, successively determining symbols for each user or group of signals (the group of signals having similar received power) by determining symbols for one user/group and removing a contribution of that one user/group from the received vector. The determined symbols corresponding to each segment are assembled into a data vector.

64 Claims, 3 Drawing Sheets

MULTI USER DETECTION USING EQUALIZATION AND SUCCESSIVE INTERFERENCE CANCELLATION

CROSS REFERENCE TO RELATED APPLICAITON(S)

This application claims priority from U.S. Provisional Application No. 60/451,591, filed Mar. 3, 2003, which is incorporated by reference as if fully set forth.

FIELD OF INVENTION

The invention generally relates to wireless communication systems. In particular, the invention relates to detection of multiple user signals in a wireless communication system.

BACKGROUND

A typical wireless communication system includes base stations which communicate with wireless transmit/receive units (WTRUs). Each base station has an associated operational area where it communicates with WTRUs which are in its operational area. In some communication systems, such as code division multiple access (CDMA), multiple communications are sent over the same frequency spectrum. These communications are typically differentiated by their codes.

Since multiple communications may be sent in the same frequency spectrum and at the same time, a receiver in such a system must distinguish between the multiple communications. One approach to detecting such signals is matched filtering. In matched filtering, a communication sent with a single code is detected. Other communications are treated as interference. To detect multiple codes, a respective number of matched filters are used. These signal detectors have a low complexity, but can suffer from multiple access interference (MAI) and inter-symbol interference (ISI).

Other signal detectors attempt to cancel the interference from other users and the ISI, such as parallel interference cancellers (PICs) and successive interference cancellers (SICs). These receivers tend to have better performance at the cost of increased complexity. Other signal detectors detect multiple communications jointly, which is referred to as joint detection. Some joint detectors use Cholesky decomposition to perform a minimum mean square error (MMSE) detection and zero-forcing block equalizers (ZF-BLEs). These detectors tend to have improved performance but high complexities.

Accordingly, it is desirable to have alternate approaches to multi-user detection.

SUMMARY

A plurality of signals are received in a shared spectrum. Samples of the received user signals are produced as a received vector. The received vector is segmented into a plurality of segments. For each segment, successively determining symbols for each user or group of signals (the group of signals having the same channel response) by determining symbols for one user/group and removing a contribution of that one user/group from the received vector. The symbols for each user/group are determined, such as by channel equalization followed by despreading. The determined symbols corresponding to each segment are assembled into a data vector.

DETAILED DESCRIPTION OF THE PREFERRED EMBODIMENT(S)

The preferred implementation of the preferred embodiments is in a frequency division duplex (FDD) mode of the third generation partnership project (3GPP) wideband code division multiple access (W-CDMA) communication system. However, the preferred embodiments can be applied to a variety of wireless communication systems.

The preferred embodiments can be utilized at a wireless transmit/receive unit (WTRU) or a base station. A WTRU includes but is not limited to a user equipment, mobile station, fixed or mobile subscriber unit, pager, or any other type of device capable of operating in a wireless environment. A "base station" includes but is not limited to a base station, Node B, site controller, access point or other interfacing device in a wireless environment. Additionally, the preferred embodiments can be applied to WTRUs communicating with each other.

Figure 1:
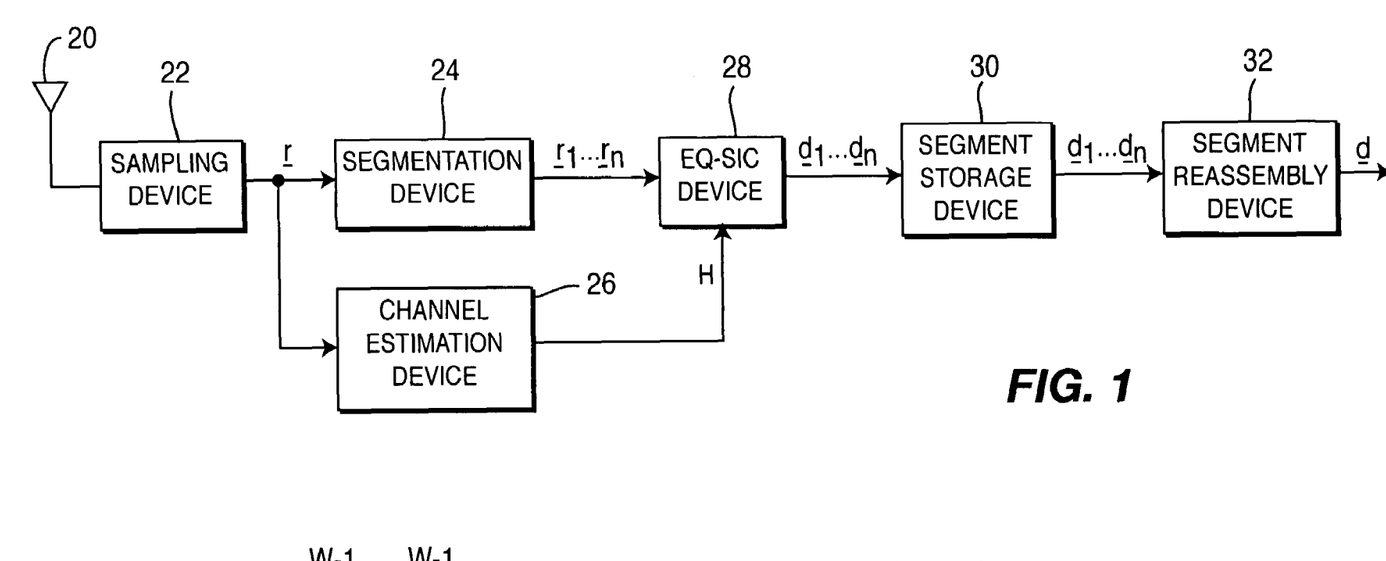
FIG. 1 is a simplified diagram of a equalization successive interference canceller (EQ-SIC) receiver.

FIG. 1 is a simplified diagram of a preferred equalization/successive interference cancellation (EQ-SIC) receiver. Preferably, most of the components shown in FIG. 1, excluding the antenna 20, are implemented as a single integrated circuit. Alternately, the individual components can be discrete components or a mixture of integrated circuit(s) and/or discrete components.

Multiple communications are received by an antenna 20 or antenna array of the receiver. A sampling device 22, such as a single or multiple analog to digital converters (ADCs), samples the received signal to produce a received vector, r.

Figure 2:
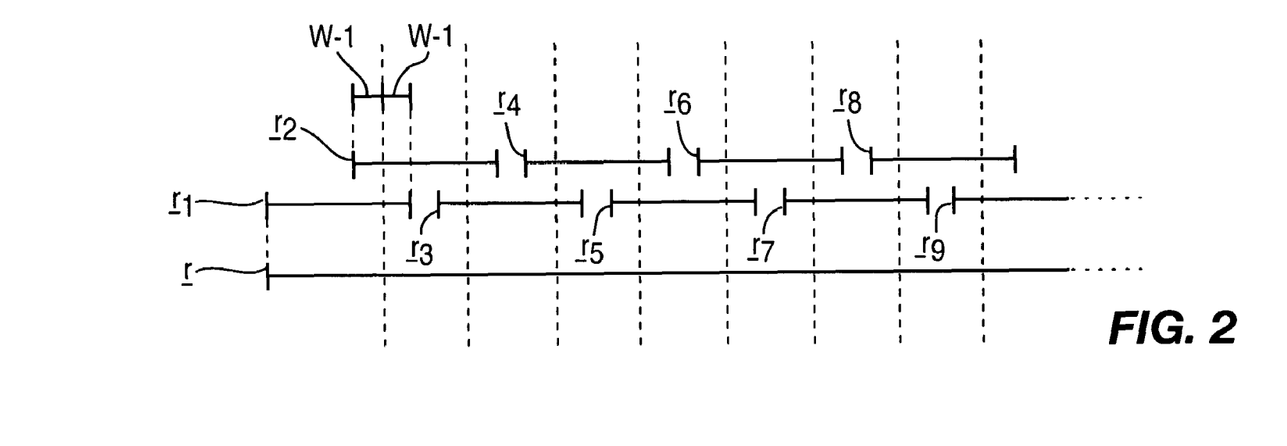
FIG. 2 is an illustration of a preferred segmentation of a received vector r.

The received vector is processed by a segmentation device 24 to produce segments, $r_1 \ldots r_n$ of the received vector r. FIG. 2 is an illustration of a preferred segmentation scheme, although others may be used. As illustrated in FIG. 2, the received vector r is separated into a plurality of segments, $r_1 \ldots r_n$, (only segments $r_1, r_2, r_3, r_4, r_5, r_6, r_7, r_8$ and $r_9$ shown). Preferably, the segments overlap as shown. The amount of the overlap is preferably twice the length the impulse response less one chip, $2*(W-1)$. W is the maximum length of the channel impulse response, over all channels of all users. This overlap facilitates the equalization of all chips, even though segments have finite length. For a given segment, all of the chips contributing to the portion of interest for that segment are equalized. To illustrate, the portion of interest of $r_2$ is bounded by the dashed lines. The last chip in that portion will extend into the next segment by W-1 chips. Conversely, the chip furthest prior to the first chip in the region of interest extending into that region is W-1 chips prior to the first chip. Accordingly, all chips contributing to the portion of interest and not in that portion can be equalized, effectively removing their contribution from the portion of interest.

Although the overlap is shown as being roughly twice the impulse response, larger overlaps may be used. The larger overlaps may be useful based on the exact receiver implementations. In one embodiment, the EQ-SIC device may use a prime factor algorithm (PFA) fast Fourier transform (FFT) based implementation. The overlap may be extended to reach a desired optimal PFA or FFT length. In other implementations, the optimal non-overlap portions may vary based on the signals being processed. To illustrate, in the time division duplex (TDD) mode of 3GPP W-CDMA, based on the burst type, the length of the data field may vary. As a result, the optimum segment length for one burst may not be optimum for another burst. To utilize one uniform hardware configuration a set size for a segment may be implemented. Different overlaps may be used to facilitate the different burst lengths.

A channel estimation device 26 estimates the channel response for each of the received user signals. Typically, the channel response is estimated using a reference signal, such as a pilot code or a midamble sequence, although other techniques may be used. The estimated channel responses are represented in FIG. 1 as a channel response matrix H.

Figure 3:
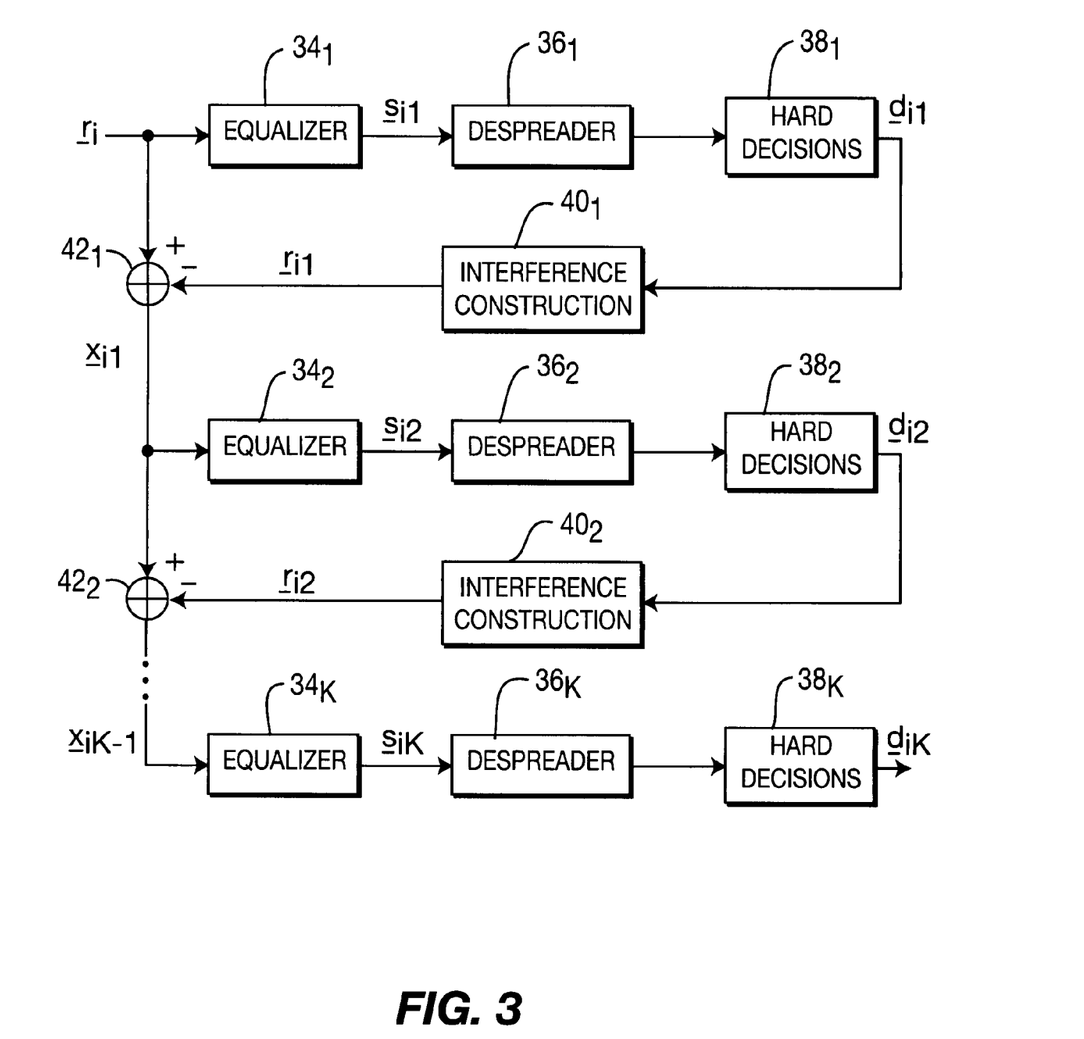
FIG. 3 is a simplified diagram of an EQ-SIC device.

FIG. 3 is an illustration of a preferred EQ-SIC device 28 applied to a received vector segment $r_i$. EQ-SIC device 28 includes equalizers $34_1, 34_2, \ldots, 34_K$ for equalizing vector segments $r_i, x_{i1}, \ldots x_{iK-1}$ configured to produce spread data vectors $s_{i1}, s_{i2}, \ldots, s_{iK}$, respectively. EQ-SIC device 28 also includes despreaders $36_1, 36_2, \ldots, 36_K$ for despreading the spread data vectors $s_{i1}, s_{iK}, \ldots, s_{iK}$, configured to produce soft symbols and hard decision devices $38_1, 38_2, \ldots, 38_K$ configured to produce hard symbols vectors $d_{i1}, d_i2, \ldots, d_{iK}$ from the respective soft symbols. EQ-SIC device 28 also includes interference construction devices $40_1, 40_2, \ldots$ for determining respective user contributions $r_{i1}, r_{i2} \ldots$ in each corresponding spread data vector $s_{i1}, s_{i2}, \ldots$ and subcontractors $42_1, 42_2 \ldots$ for subtracting respective user contributions $r_{i1}, r_{i2}, \ldots$ from respective corresponding vector segments $r_i, x_{i1} \ldots$ In one implementation, all of the user signals are ranked, such as by their received power. For the user having the highest received power, the received vector segment $r_i$ is equalized by a equalizer $34_1$ using the channel response associated with that user (user 1), producing a spread data vector $s_{i1}$. The codes used by that user signal are used to produce soft symbols of that user data by a despreader $36_1$. Hard decisions are performed on that user's soft symbols by a hard decision device $38_1$ to produce a hard symbol vector, $d_{i1}$. Using the detected hard symbols, the contribution of user 1 to the spread data vector is determined, $r_{i1}$, by interference construction device $40_1$. The user 1 contribution is subtracted from the segment by a subtractor $42_1$ producing a new segment $x_{i1}$ having user 1's contribution removed. Similar processing is performed on a second user (user 2) having a second highest received power level. User 2's hard symbols, $d_{i2}$, are detected using an equalizer $34_2$, producing spread data vector $S_{i2}$, despreader $36_2$ and hard decision device $38_2$. The contribution of user 2 to $X_{i1}$, $r_{i2}$, is removed using an interference construction device $40_2$ and a subtractor $42_2$. This procedure is repeated K–1 times to produce segment $x_{iK-1}$ which is vector $r_i$ with the contributions of K–1 users removed. For the $K^{th}$ user, only the hard symbols $d_{iK}$ are determined using an equalizer $34_K$, producing spread data vector $s_{iK}$, despreader $36_K$ and hard decision device $38_K$.

If the EQ-SIC receiver is used at a base station, typically, the hard symbols from all of the users signals are recovered. However, at a WTRU, the WTRU EQ-SIC receiver may only have one user's signal of interest. As a result, the successive processing of each user can be stopped after the hard symbols of that user of interest's signals are recovered.

Although the previous description detected each user's signals separately, multiple users signals may be recovered jointly. In such an implementation, the users would be grouped by received signal power. The successive processing would be performed on each group, in turn. To illustrate, the first groups data would be detected and subsequently canceled from the received segment, followed by the second group.

After the data for each user in a segment is detected, the data vector, such as di, is stored by a segment storage device 30. To reduce the storage size, preferably, the segment is truncated to remove portions not of interest, only leaving the portion of the segment of interest. A segment reassembly device 32 produces a data vector, d, having the data from all the segments, typically by serially combining the data for each user for each segment. To illustrate, the data from user 1 for segment 1, $d_{11}$, is serially combined with the data from user 1 for segment 2, $d_{12}$.

Figure 4:
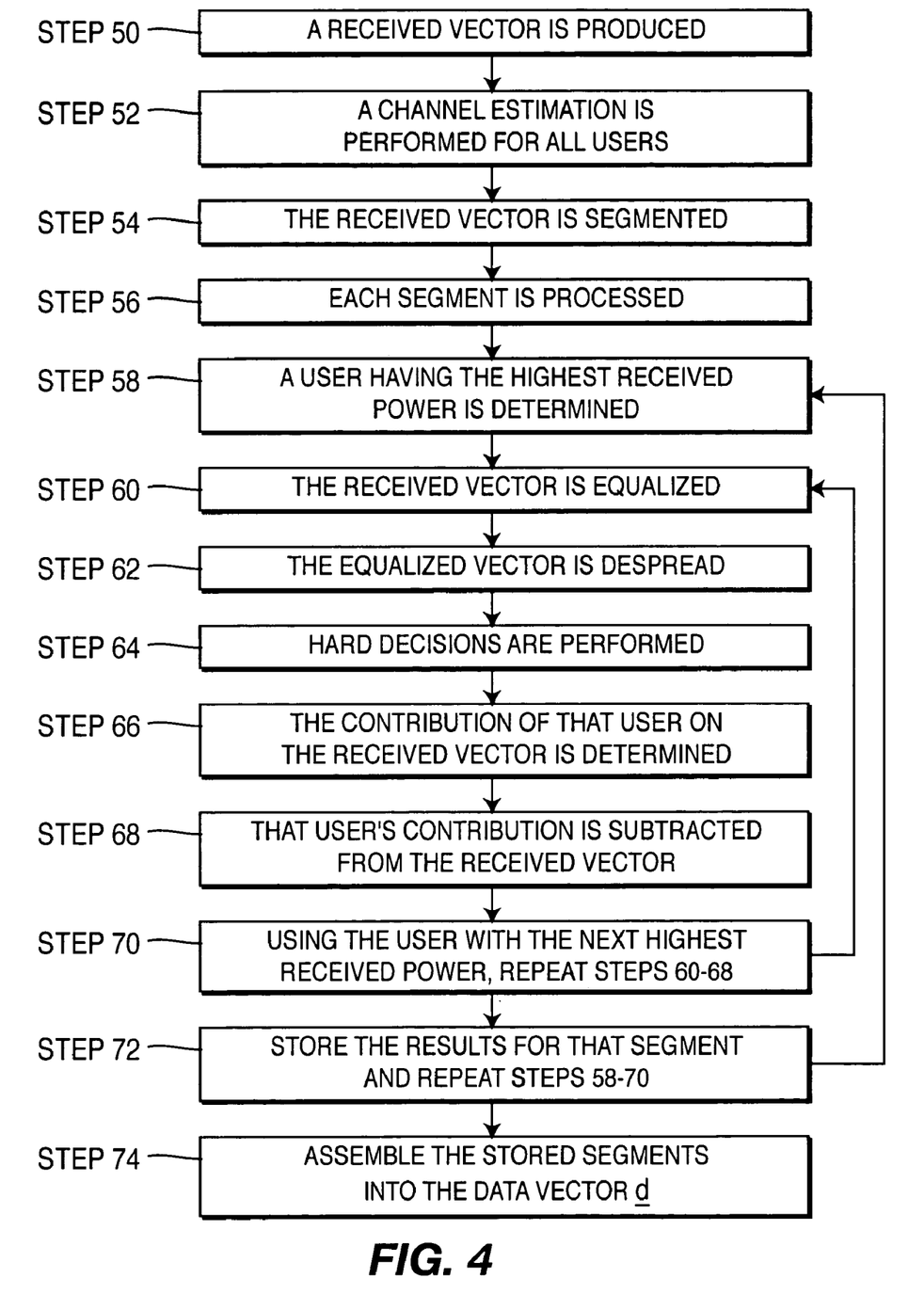
FIG. 4 is a flow chart for an EQ-SIC receiver.

FIG. 4 is a flow chart for an EQ-SIC receiver. Initially, a received vector r is produced, step 50. A channel estimation is performed for all the users, step 52. The received vector is segmented, $r_1 \ldots r_n$, step 54. Each segment is processed, step 56. For an $i^{th}$ segment, a user having the highest received power is determined, step 58. The received vector is equalized for that user, step 60. The resulting spread vector is despread using that user's code, step 62. Hard decisions are performed on the despread data, step 64. The contribution of that user to the received vector is determined, step 66. That user's contribution is subtracted from the received vector, step 68. The next highest received power user is processed by repeating steps 60-68, using the subtracted received vector as the received vector in those steps, step 70. Store the results for that segment and repeat steps 58-70 for each remaining segment, step 72. Assemble the stored segments into the data vector d, step 74. The rate at which channel estimates are made or updated can vary between different implementations, as the rate of updated depends on the time varying nature of the wireless channels.

Preferably, the equalization for each stage of the EQ-SIC device 28 is implemented using FFT, although other implementations may be used. One potential implementation is as follows. Each received segment can be viewed as a signal model per Equation 1.

$$r_i = Hs + n \qquad \text{Equation 1}$$

H is the channel response matrix. n is the noise vector. s is the spread data vector, which is the convolution of the spreading codes, C, for the user or group and the data vector, d, for the user or group, as per Equation 2.

$$s = Cd \qquad \text{Equation 2}$$

Two approaches to solve Equation 3 use an equalization stage followed by a despreading stage. Each received vector segment, $r_i$, is equalized, step 54. One equalization approach uses a minimum mean square error (MMSE) solution. The MMSE solution for each extended segment is per Equation 4A.

$$\hat{s}_i = (H_s^H H_s + \sigma^2 I_s)^{-1} H_s^H r_i \qquad \text{Equation 4A}$$

$\sigma^2$ is the noise variance and $I_s$ is the identity matrix for the extended matrix. $(\bullet)^H$ is the complex conjugate transpose operation or Hermetian operation. The zero forcing (ZF) solution is per Equation 4B $$\hat{s}_i = (H_s^H H_s)^{-1} H_s^H r_i \qquad \text{Equation 4B}$$

Alternately, Equations 4A or 4B is written as Equation 5.

$$\hat{s}_i = R_s^{-1} H_s^H r_i \qquad \text{Equation 5}$$

$R_s$ is defined per Equation 6A corresponding to MMSE.

$$R_s = H_s^H H_s + \sigma^2 I_s \quad \text{Equation 6A}$$

Alternately, $R_s$ for ZF is per Equation 6B.

$$R_s = H_s^H H_s \quad \text{Equation 6B}$$

One preferred approach to solve Equation 5 is by a fast Fourier transform (FFT) as per Equations 7 and 8, an alternate approach to solve Equation 5 is by Cholesky decomposition.

$$R_s = D_z^{-1} \Lambda D_z = (1/P) D_z^* \Lambda D_z \quad \text{Equation 7}$$

$$R_s^{-1} = D_z^{-1} \Lambda^{-1} D_z = (1/P) D_z^* \Lambda^* D_z \quad \text{Equation 8}$$

$D_z$ is the Z-point FFT matrix and $\Lambda$ is the diagonal matrix, which has diagonals that are an FFT of the first column of a circulant approximation of the $R_s$ matrix. The circulant approximation can be performed using any column of the $R_s$ matrix. Preferably, a full column, having the most number of elements, is used.

In the frequency domain, the FFT solution is per Equation 9.

$$F(\hat{s}) = \frac{\sum_{m=1}^{M} F(\underline{h}_m)^* \otimes F(\underline{r}_m)}{F(q)} \quad \text{Equation 9}$$

$$\text{where } F(\underline{x}) = \sum_{n=0}^{P-1} x(n) e^{-j \frac{2\pi k n}{N}},$$

where $k = 0, 1, \ldots, P-1$ $\otimes$ is the kronecker product. M is the sampling rate. M=1 is chip rate sampling and M=2 is twice the chip rate sampling.

After the Fourier transform of the spread data vector, $F(\hat{s})$, is determined, the spread data vector $\hat{s}$ is determined by taking an inverse Fourier transform.

What is claimed is:

1. A method for receiving signals in a wireless communication system, the method comprising:
   receiving a plurality of user signals in a shared spectrum;
   producing samples of the received user signals as a received vector;
   segmenting the received vector into a plurality of segments;
   for each segment, successively determining symbols for each user by determining symbols for one user and removing a contribution of that one user from the corresponding segment; and
   assembling the determined symbols corresponding to each segment into a data vector.

2. The method of claim 1 wherein each segment has a portion overlapping with at least one other segment.

3. The method of claim 2 wherein the overlapping portion is at least two chips less than twice an impulse response length.

4. The method of claim 2 further comprising storing each segment determined symbols, after truncating determined symbols.

5. The method of claim 1 wherein the successively determining symbols for each user comprises equalizing an input vector, despreading the equalized vector and making hard decisions on the despread equalized vector.

6. The method of claim 5 wherein the equalizing the input vector uses fast Fourier transforms.

7. A method for receiving signals in a wireless communication system, the method comprising:
   receiving a plurality of signals in a shared spectrum;
   producing samples of the received signals as a received vector;
   segmenting the received vector into a plurality of segments;
   grouping the received signals by received power level;
   for each segment, successively determining symbols for each group by determining symbols for one group and removing a contribution of that one group from the corresponding segment; and
   assembling the determined symbols corresponding to each segment into a data vector.

8. The method of claim 7 wherein each segment has a portion overlapping with at least one other segment.

9. The method of claim 8 wherein the overlapping portion is at least two chips less than twice an inpulse response length.

10. The method of claim 8 further comprising storing each segment determined symbols, after truncating determined symbols.

11. The method of claim 7 wherein the successively determining symbols for each user comprises equalizing an input vector, despreading the equalized vector and making hard decisions on the despread equalized vector.

12. The method of claim 11 wherein the equalizing the input vector uses fast Fourier transforms.

13. A wireless transmit/receive unit (WTRU) comprising:
   an antenna configured to receive a plurality of user signals in a shared spectrum;
   a sampling device configured to produce samples of the received user signals as a received vector;
   a segmentation device configured to segment the received vector into a plurality of segments;
   an equalization and successive interference canceller configured to successively determine for each segment symbols for each user by determining symbols for one user and removing a contribution of that one user from the corresponding segment; and
   a segment reassembly device configured to assemble the determined symbols corresponding to each segment into a data vector.

14. The WTRU of claim 13 wherein the segmentation device is configured to segment the received vector into a plurality of segments such that each segment has a portion overlapping with at least one other segment.

15. The WTRU of claim 14 wherein the segmentation device is configured to segment the received vector into a plurality of segments such that the overlapping portion is at least two chips less than twice an inpulse response length.

16. The WTRU of claim 14 further comprising a segment storing device configured to store each segment determined symbols, after truncating determined symbols.

17. The WTRU of claim 16 wherein the equalization and successive interference canceller comprises an equalizer configured to equalize an input vector, a despreader configured to despread the equalized vector and a hard decision device configured to make hard decisions on the despread equalized vector.

18. The WTRU of claim 17 wherein the equalizer is configured to equalize the input vector using fast Fourier transforms.

19. A wireless transmit/receive unit (WTRU) comprising:
   means for receiving a plurality of user signals in a shared spectrum;
   means for producing samples of the received user signals as a received vector;

means for segmenting the received vector into a plurality of segments;
means for successively determining for each segment symbols for each user by determining symbols for one user and removing a contribution of that one user from the corresponding segment; and
means for assembling the determined symbols corresponding to each segment into a data vector.

20. The WTRU of claim 19 wherein the means for segmenting is configured to segment the received vector into a plurality of segments such that each segment has a portion overlapping with at least one other segment.

21. The WTRU of claim 20 wherein the means for segmenting is configured to segment the received vector into a plurality of segments such that the overlapping portion is at least two chips less than twice an inpulse response length.

22. The WTRU of claim 20 further comprising means for storing each segments determined symbols, after truncating determined symbols.

23. The WTRU of claim 22 wherein the means for successively determining symbols comprises an equalizer means for equalizing an input vector, a despreader means for despreading the equalized vector and a hard decision means for making hard decisions on the despread equalized vector.

24. The WTRU of claim 23 wherein the equalizing the input vector uses fast Fourier transforms.

25. A wireless transmit/receive unit (WTRU) comprising:
an antenna configured to receive a plurality of user signals in a shared spectrum;
a sampling device configured to produce samples of the received signals as a received vector;
a segmentation device configured to segment the received vector into a plurality of segments;
an equalization and successive interference canceller, for each group of received signals having a similar power level, configured to successively determine for each segment symbols for each group by determining symbols for one group and removing a contribution of that one group from the corresponding segment; and
a segment reassembly device configured to assemble the determined symbols corresponding to each segment into a data vector.

26. The WTRU of claim 25 wherein the segmentation device is configured to segment the received vector into a plurality of segments such that each segment has a portion overlapping with at least one other segment.

27. The WTRU of claim 26 wherein the segmentation device is configured to segment the received vector into a plurality of segments such that the overlapping portion is at least two chips less than twice an inpulse response length.

28. The WTRU of claim 26 further comprising a segment storing device configured to store each segment determined symbols, after truncating determined symbols.

29. The WTRU of claim 28 wherein the equalization and successive interference canceller comprises an equalizer configured to equalize an input vector, a despreader configured to despread the equalized vector and a hard decision device configured to make hard decisions on the despread equalized vector.

30. The WTRU of claim 29 wherein the equalizer is configured to equalize the input vector using fast Fourier transforms.

31. A wireless transmit/receive unit (WTRU) comprising:
means for receiving a plurality of signals in a shared spectrum;
means for producing samples of the received signals as a received vector;
means for segmenting the received vector into a plurality of segments;
means for successively determining for each segment symbols for each group of received signals having a similar power level by determining symbols for one group and removing a contribution of that one group from the corresponding segment; and
means for assembling the determined symbols corresponding to each segment into a data vector.

32. The WTRU of claim 31 wherein the means for segmenting is configured to segment the received vector into a plurality of segments such that each segment has a portion overlapping with at least one other segment.

33. The WTRU of claim 32 wherein the means for segmenting is configured to segment the received vector into a plurality of segments such that the overlapping portion is at least two chips less than twice an inpulse response length.

34. The WTRU of claim 32 further comprising means for storing each segments determined symbols, after truncating determined symbols.

35. The WTRU of claim 34 wherein the means for successively determining symbols comprises an equalizer means for equalizing an input vector, a despreader means for despreading the equalized vector and a hard decision means for making hard decisions on the despread equalized vector.

36. The WTRU of claim 35 wherein the means for equalizing the input vector uses fast Fourier transforms.

37. A base station comprising:
an antenna configured to receive a plurality of user signals in a shared spectrum;
a sampling device configured to produce samples of the received user signals as a received vector;
a segmentation device configured to segment the received vector into a plurality of segments;
an equalization and successive interference canceller configured to successively determine for each segment symbols for each user by determining symbols for one user and removing a contribution of that one user from the corresponding segment; and
a segment reassembly device configured to assemble the determined symbols corresponding to each segment into a data vector.

38. The base station of claim 37 wherein the segmentation device is configured to segment the received vector into a plurality of segments such that each segment has a portion overlapping with at least one other segment.

39. The base station of claim 38 wherein the segmentation device is configured to segment the received vector into a plurality of segments such that the overlapping portion is at least two chips less than twice an inpulse response length.

40. The base station of claim 38 further comprising a segment storing device configured to store each segment determined symbols, after truncating determined symbols.

41. The base station of claim 40 wherein the equalization and successive interference canceller comprises an equalizer configured to equalize equalizing an input vector, a despreader configured to despread the equalized vector and a hard decision device configured to make hard decisions on the despread equalized vector.

42. The base station of claim 41 wherein the equalizer is configured to equalize the input vector using fast Fourier transforms.

43. A base station comprising:
means for receiving a plurality of user signals in a shared spectrum;
means for producing samples of the received user signals as a received vector;

means for segmenting the received vector into a plurality of segments;

means for successively determining for each segment symbols for each user by determining symbols for one user and removing a contribution of that one user from the corresponding segment; and means for assembling the determined symbols corresponding to each segment into a data vector.

44. The base station of claim 43 wherein the means for segmenting is configured to segment the received vector into a plurality of segments such that each segment has a portion overlapping with at least one other segment.

45. The base station of claim 44 wherein the means for segmenting is configured to segment the received vector into a plurality of segments such that the overlapping portion is at least two chips less than twice an impulse response length.

46. The base station of claim 44 further comprising means for storing each segments determined symbols, after truncating determined symbols.

47. The base station of claim 46 wherein the means for successively determining symbols comprises an equalizer means for equalizing an input vector, a despreader means for despreading the equalized vector and a hard decision means for making hard decisions on the despread equalized vector.

48. The base station of claim 47 wherein the means for equalizing the input vector uses fast Fourier transforms.

49. A base station comprising:
   an antenna configured to receive a plurality of user signals in a shared spectrum;
   a sampling device configured to produce samples of the received signals as a received vector;
   a segmentation device configured to segment the received vector into a plurality of segments;
   an equalization and successive interference canceller, for each group of received signals having a similar power level, configured to successively determine for each segment symbols for each group by determining symbols for one group and removing a contribution of that one group from the corresponding segment; and
   a segment reassembly device assembling the determined symbols corresponding to each segment into a data vector.

50. The base station of claim 49 wherein the segmentation device is configured to segment the received vector into a plurality of segments such that each segment has a portion overlapping with at least one other segment.

51. The base station of claim 50 wherein the segmentation device is configured to segment the received vector into a plurality of segments such that the overlapping portion is at least two chips less than twice an inpulse response length.

52. The base station of claim 50 further comprising a segment storing device configured to store each segment determined symbols, after truncating determined symbols.

53. The base station of claim 51 wherein the equalization and successive interference canceller comprises an equalizer configured to equalize an input vector, a despreader configured to despread the equalized vector and a hard decision device configured to make hard decisions on the despread equalized vector.

54. The base station of claim 53 wherein the equalizer is configured to equalize the input vector using fast Fourier transforms.

55. A base station comprising:
   means for receiving a plurality of signals in a shared spectrum;
   means for producing samples of the received signals as a received vector;
   means for segmenting the received vector into a plurality of segments;
   means for successively determining for each segment symbols for each group of received signals having a similar power level by determining symbols for one group and removing a contribution of that one group from the corresponding segment; and
   means for assembling the determined symbols corresponding to each segment into a data vector.

56. The base station of claim 55 wherein the means for segmenting is configured to segment the received vector into a plurality of segments such that each segment has a portion overlapping with at least one other segment.

57. The base station of claim 56 wherein the means for segmenting is configured to segment the received vector into a plurality of segments such that the overlapping portion is at least two chips less than twice an inpulse response length.

58. The base station of claim 56 further comprising means for storing each segments determined symbols, after truncating determined symbols.

59. The base station of claim 58 wherein the means for successively determining symbols comprises an equalizer means for equalizing an input vector, a despreader means for despreading the equalized vector and a hard decision means for making hard decisions on the despread equalized vector.

60. The base station of claim 59 wherein means for the equalizing the input vector uses fast Fourier transforms.

61. An integrated circuit comprising:
   a segmentation device configured to segment received vector of a plurality of user signals into a plurality of segments;
   an equalization and successive interference canceller configured to successively determine for each segment symbols for each user by determining symbols for one user and removing a contribution of that one user from the respective segment; and
   a segment reassembly device configured to assemble the determined symbols corresponding to each segment into a data vector.

62. The integrated circuit of claim 61 wherein the equalization and successive interference canceller comprises an equalizer configured to equalize an input vector, a despreader configured to despread the equalized vector and a hard decision device configured to make hard decisions on the despread equalized vector.

63. An integrated circuit comprising:
   a segmentation device configured to segment a received vector of a plurality of signals into a plurality of segments;
   an equalization and successive interference canceller, for each group of received signals having a similar power level, configured to successively determine for each segment symbols for each group by determining symbols for one group and removing a contribution of that one group from the respective segment received vector; and
   a segment reassembly device configured to assemble the determined symbols corresponding to each segment into a data vector.

64. The integrated circuit of claim 63 wherein the equalization and successive interference canceller comprises an equalizer configured to equalize an input vector, a despreader configured to despread the equalized vector and a hard decision device configured to make hard decisions on the despread equalized vector.

* * * * *

UNITED STATES PATENT AND TRADEMARK OFFICE
CERTIFICATE OF CORRECTION

PATENT NO. : 7,346,103 B2
APPLICATION NO. : 10/748544
DATED : March 18, 2008
INVENTOR(S) : Ariela Zeira It is certified that error appears in the above-identified patent and that said Letters Patent is hereby corrected as shown below:

ON THE TITLE PAGE

Item (56), OTHER PUBLICATIONS, page 1, right column, line 11, on line beginning with "Misra et al.", after the word "Hybrid", insert --of--.

At column 2, line 6, after the word "vector", delete "r" and insert therefor --$\underline{r}$--.

At column 2, line 39, after the word "vector", delete "r" and insert therefor --$\underline{r}$--.

At column 2, line 41, after the word "segments", delete "$r_1 \ldots r_n$" and insert therefor --$\underline{r}_1 \ldots \underline{r}_n$--.

At column 2, line 42, after the word "vector", delete "r" and insert therefor --$\underline{r}$--.

At column 2, line 44, after the word "vector", delete "r" and insert therefor --$\underline{r}$--.

At column 2, line 45, after the first use of the word "segments", delete "$r_1 \ldots r_n$" and insert therefor --$\underline{r}_1 \ldots r_n$--.

At column 2, line 45, after the words "only segments", delete "$r_1, r_2, r_3, r_4, r_5, r_6, r_7, r_8$" and insert therefor --$\underline{r}_1, \underline{r}_2, \underline{r}_3, \underline{r}_4, \underline{r}_5, \underline{r}_6, \underline{r}_7, \underline{r}_8$--.

At column 2, line 46, before the word "shown", delete "$r_9$" and insert therefor --$\underline{r}_9$--.

At column 2, lines 47 & 48, after the words "overlap is", delete "preferably twice the length the impulse response less one chip, 2*(W-1)" and insert therefor --at least two chips less than twice an impulse response length--.

At column 2, line 54, after the words "interest of", delete "$r_2$" and insert therefor --$\underline{r}_2$--.

At column 3, line 18, after the word "segment", delete "$r_i$" and insert therefor --$\underline{r}_i$--.

At column 3, line 20, after the word "segments", delete "$r_i, x_{i1}, \ldots, x_{iK}\_1$" and insert therefor --$\underline{r}_i, \underline{x}_{i1}, \ldots \underline{x}_{iK-1}$--.

At column 3, line 21, after the word "vectors", delete "$s_{i1}, s_{i2}, \ldots, s_{iK}$" and insert therefor --$\underline{s}_{i1}, \underline{s}_{i2}, \ldots, \underline{s}_{iK}$--.

UNITED STATES PATENT AND TRADEMARK OFFICE
CERTIFICATE OF CORRECTION

| | | |
|---|---|---|
| PATENT NO. | : 7,346,103 B2 | |
| APPLICATION NO. | : 10/748544 | |
| DATED | : March 18, 2008 | |
| INVENTOR(S) | : Ariela Zeira | |

It is certified that error appears in the above-identified patent and that said Letters Patent is hereby corrected as shown below:

At column 3, line 23, after the word "vectors", delete "$s_{i1}, s_{iK}, ..., s_{iK}$" and insert therefor --$\underline{s}_{i1}, \underline{s}_{i2}, ..., \underline{s}_{iK}$--.

At column 3, line 25, after the word "vectors", delete "$d_{i1}, d_i2, ..., d_{iK}$" and insert therefor --$\underline{d}_{i1}, \underline{d}_{i2}, ..., d_{iK}$--.

At column 3, line 28, after the words "contributions", delete "$r_{i1}, r_{i2}, ...$" and insert therefor --$\underline{r}_{i1}, \underline{r}_{i2}, ...$--.

At column 3, line 29, after the word "vector", delete "$s_{i1}, s_{i2}, ...$" and insert therefor --$\underline{s}_{i1}, \underline{s}_{i2}, ...$--.

At column 3, line 31, after "butions", delete "$r_{i1}, r_{i2}, ...$" and insert therefor --$\underline{r}_{i1}, \underline{r}_{i2}, ...$--.

At column 3, line 32, after the word "segments", delete "$r_i, x_{i1}, ...$" and insert therefor --$\underline{r}_i, \underline{x}_{i1}, ...$--.

At column 3, line 35, after the word "segment", delete "$r_i$ is equalized by a" and insert therefor --$\underline{r}_i$ is equalized by an--.

At column 3, line 37, after the word "vector", delete "$s_{i1}$" and insert therefor --$\underline{s}_{i1}$--.

At column 3, line 41, after the word "vector", delete "$d_{i1}$" and insert therefor --$\underline{d}_{i1}$--.

At column 3, line 43, after "mined", delete "$r_{i1}$" and insert therefor --$\underline{r}_{i1}$--.

At column 3, line 45, after the word "segment", delete "$x_{i1}$" and insert therefor --$\underline{x}_{i1}$--.

At column 3, line 48, after the word "symbols", delete "$d_{i2}$" and insert therefor --$\underline{d}_{i2}$--.

At column 3, line 49, after the word "vector", delete "$S_{i2}$" and insert therefor --$\underline{s}_{i2}$--.

At column 3, lines 50 & 51, after the words "user 2 to", delete "$X_{i1}, r_{i2}$" and insert therefor --$\underline{x}_{i1}, r_{i2}$--.

At column 3, line 53, after the word "segment", delete "$x_{iK-1}$ which is vector $r_i$" and insert therefor --$\underline{x}_{iK-1}$ which is vector $\underline{r}_i$--.

UNITED STATES PATENT AND TRADEMARK OFFICE
CERTIFICATE OF CORRECTION

PATENT NO. : 7,346,103 B2
APPLICATION NO. : 10/748544
DATED : March 18, 2008
INVENTOR(S) : Ariela Zeira It is certified that error appears in the above-identified patent and that said Letters Patent is hereby corrected as shown below:

At column 3, line 55, after the word "symbols", delete "$d_{iK}$" and insert therefor --$\underline{d}_{iK}$--.

At column 3, line 56, after the word "vector", delete "$s_{iK}$" and insert therefor --$\underline{s}_{iK}$--.

At column 3, line 59, before the word "signals", delete "users" and insert therefor --user's--.

At column 4, line 2, before the word "data", delete "groups" and insert therefor --group's--.

At column 4, line 6, after the words "such as", delete "$d_i$" and insert therefor --$\underline{d}_i$--.

At column 4, line 11, after the words "vector", delete "d" and insert therefor --$\underline{d}$--.

At column 4, line 14, after the word "segment 1", delete "$d_{11}$" and insert therefor --$\underline{d}_{11}$--.

At column 4, line 15, after the word "segment 2", delete "$d_{12}$" and insert therefor --$\underline{d}_{12}$--.

At column 4, line 17, after the word "vector", delete "r" and insert therefor --$\underline{r}$--.

At column 4, line 19, after the word "segmented", delete "$r_1 \ldots r_n$" and insert therefor --$\underline{r}_1 \ldots \underline{r}_n$--.

At column 4, line 32, after the word "vector", delete "d" and insert therefor --$\underline{d}$--.

At column 4, line 42, delete Equation 1, and insert therefor --$\underline{r}_i = H\underline{s} + \underline{n}$--.

At column 4, line 44, after the word "matrix", delete "n is the noise vector. s" and insert therefor --$\underline{n}$ is the noise vector. $\underline{s}$--.

At column 4, line 47, after the words "for the", delete "d" and insert therefor --$\underline{d}$--.

At column 4, line 49, delete Equation 2, and insert therefor --$\underline{s} = C\underline{d}$--.

At column 4, line 52, after the word "segment", delete "$r_i$" and insert therefor --$\underline{r}_i$--.

At column 4, line 57, delete Equation 4A, and insert therefor
--$\underline{\hat{s}}_i = (H_s^H H_s + \sigma^2 I_s)^{-1} H_s^H \underline{r}_i$--.

UNITED STATES PATENT AND TRADEMARK OFFICE
CERTIFICATE OF CORRECTION

| PATENT NO. | : 7,346,103 B2 |
|---|---|
| APPLICATION NO. | : 10/748544 |
| DATED | : March 18, 2008 |
| INVENTOR(S) | : Ariela Zeira |

It is certified that error appears in the above-identified patent and that said Letters Patent is hereby corrected as shown below:

At column 4, line 61, before the word "operation", delete "Hermetian" and insert therefor --Hermitian--.

At column 4, line 64, delete Equation 4B, and insert therefor --$\underline{\hat{s}}_i = (H_s^H H_s)^{-1} H_s^H \underline{r}_i$--.

At column 4, line 67, delete Equation 5, and insert therefor --$\underline{\hat{s}}_i = R_s^{-1} H_s^H \underline{r}_i$--.

At column 5, line 35, before the word "product", delete "kronecker" and insert therefor --Kronecker--.

At column 5, line 37, after the word "vector", delete "F(ŝ)" and insert therefor --F($\underline{\hat{s}}$)--.

At column 5, line 38, after the word "vector", delete "ŝ" and insert therefor --$\underline{\hat{s}}$--.

IN THE CLAIMS

At claim 1, column 5, lines 41 & 42, after the word "signals", delete "in a wireless communication system, the method".

At claim 7, column 6, lines 1 & 2, after the word "signals", delete "in a wireless communication system, the method".

At claim 22, column 7, line 18, before the word "determined", delete "segments" and insert therefor --segment's--.

At claim 28, column 7, line 52, before the word "determined", delete "segments" and insert therefor --segment's--.

At claim 34, column 8, line 19, before the word "determined", delete "segments" and insert therefor --segment's--.

At claim 40, column 8, line 51, after the word "each", delete "segment" and insert therefor --segment's--.

At claim 41, column 8, line 56, after the word "equalize", delete "equalizing".

UNITED STATES PATENT AND TRADEMARK OFFICE
CERTIFICATE OF CORRECTION

PATENT NO. : 7,346,103 B2
APPLICATION NO. : 10/748544
DATED : March 18, 2008
INVENTOR(S) : Ariela Zeira It is certified that error appears in the above-identified patent and that said Letters Patent is hereby corrected as shown below:

At claim 46, column 9, line 18, before the word "determined", delete "segments" and insert therefor --segment's--.

At claim 52, column 9, line 51, after the word "each", delete "segment" and insert therefor --segment's--.

At claim 58, column 10, line 19, before the word "determined", delete "segments" and insert therefor --segment's--.

Signed and Sealed this

Fifteenth Day of July, 2008

JON W. DUDAS
*Director of the United States Patent and Trademark Office*